United States Patent [19]

Van Rooij

[11] Patent Number: 5,428,402
[45] Date of Patent: Jun. 27, 1995

[54] TINT DETECTION CIRCUIT FOR AUTOMATICALLY SELECTING A DESIRED TINT IN A VIDEO SIGNAL

[75] Inventor: Johannes H. J. M. Van Rooij, Breda, Netherlands

[73] Assignee: U.S. Philips Corporation, New York, N.Y.

[21] Appl. No.: 227,216

[22] Filed: Apr. 13, 1994

[30] Foreign Application Priority Data

Apr. 16, 1993 [BE] Belgium .............. 09300376

[51] Int. Cl.[6] .................. H04N 9/64; H04N 9/73
[52] U.S. Cl. .................. 348/649; 348/652; 348/25; 348/29; 348/30; 348/28
[58] Field of Search ............... 348/29, 30, 223, 652, 348/649, 25, 28, 645, 644, 643; H04N 9/64, 9/73

[56] References Cited

U.S. PATENT DOCUMENTS

| | | | |
|---|---|---|---|
| 3,873,760 | 3/1975 | Worden | 348/652 |
| 4,327,374 | 4/1982 | Matsuda et al. | 358/28 |
| 4,506,293 | 3/1985 | Hurst, Jr. | |
| 4,523,221 | 7/1985 | Chin et al. | 358/21 R |
| 4,528,586 | 7/1985 | Lewis, Jr. et al. | 358/28 |
| 4,667,223 | 5/1987 | Flamm | 348/652 |
| 4,823,184 | 4/1989 | Belmares-Sarabia et al. | 348/650 |
| 4,891,689 | 1/1990 | Sendra et al. | 348/659 |
| 5,255,076 | 10/1993 | Koyano | 348/652 |

*Primary Examiner*—James J. Groody
*Assistant Examiner*—Nina M. West
*Attorney, Agent, or Firm*—Edward W. Goodman

[57] ABSTRACT

Tint detection circuit for automatically selecting a desired tint in a video signal, including a limit signal generator coupled to receive first (R), second (G) and third (R) color signals in order to generate first and second limit signals (CRITR, CRITB); a color-difference generator coupled to receive the first (R), second (G) and third (B) color signals in order to generate first and second color difference signals (G−R, G−B); and a window comparator coupled to the limit signal generator and to the color-difference generator in order to determine whether the first and second color difference signals (G−R, G−B) are within the windows determined by the first and second limit signals (CRITR, CRITB) so as to supply a tint detection signal.

5 Claims, 2 Drawing Sheets

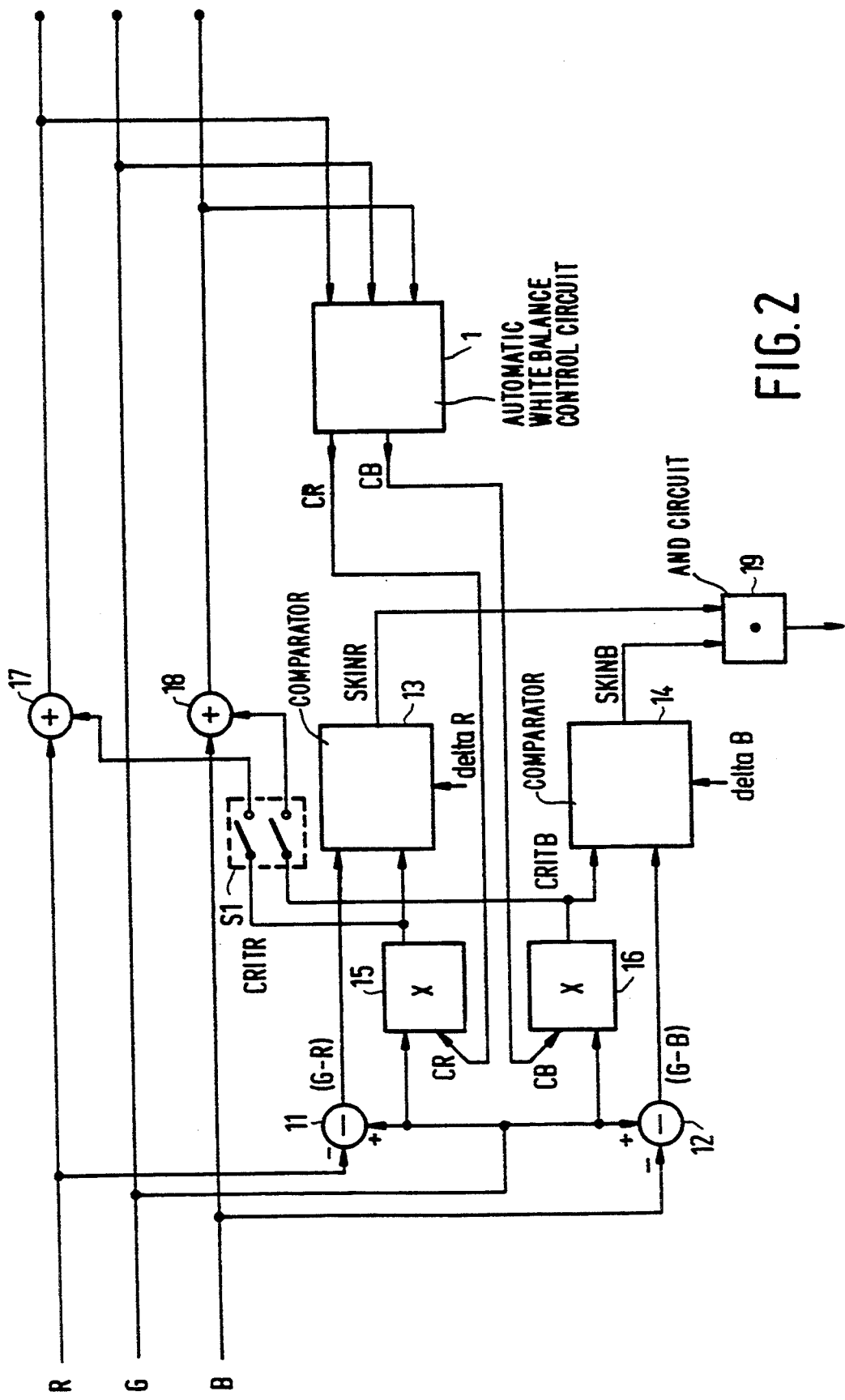

TINT DETECTION CIRCUIT FOR AUTOMATICALLY SELECTING A DESIRED TINT IN A VIDEO SIGNAL

BACKGROUND OF THE INVENTION

1. Field of the Invention

The invention relates to a tint detection circuit. Such a circuit is used in a television camera, for example for adjusting skin contours in a different way than for other tints. It is also possible to control other aspects with a (skin) tint detection signal obtained, such as RGB-YUV matrixing, color saturation, etc. The invention also relates to a camera provided with a tint detection circuit. Yet another aspect of the invention relates to a method of automatically selecting a desired tint in a video signal.

2. Description of the Related Art

A separate flesh tone contour control is described in U.S. Pat. No. 4,506,293. The contour signal of the camera is modulated with a keying signal from a skin tone detector. The circuit described in U.S. Pat. No. 4,506,293 starts from a fixed vector in the R−Y, B−Y diagram, viz. the I axis. Other cameras (Ikegami) have a manually selectable vector (R-hue and B-hue keys) for selecting the desired skin tone. Thus, all these skin contour control circuits known so far operate without an automatic selection of the skin tone at which the circuit must be active.

A problem of such an automatic or non-automatic selection of the skin tone at which the circuit must be active is that skin tones may vary considerably from person to person. A circuit having a fixed skin contour control as described in U.S. Pat. No. 4,506,293 will therefore have to be little selective and will thus also select many unwanted background colors of the scene. A manual selection of the correct skin tone is better but is rather cumbersome, which has a detrimental influence on the convenience of use of the Ikegami circuit. An automatic control device which automatically selects the skin tone at which the circuit must be active will therefore be preferred from a user's point of view.

SUMMARY OF THE INVENTION

It is, inter alia an object of the invention to provide an automatic control device which automatically selects a desired tint. To this end, a first aspect of the invention provides a tint detection circuit for automatically selecting a desired tint in a video signal, comprising limit-signal generating means coupled to receive first (R), second (G) and third (B) color signals in order to generate first and second limit signals (CRITR, CRITB); color-difference generating means coupled to receive said first (R), second (G) and third (B) color signal in order to generate first and second color difference signals (G−R, G−B); and window comparison means couple to said limit-signal generating means and to said color-difference generating means in order to determine whether said first and second color difference signals (G−R, G−B) are within windows determined by said first and second limit signals (CRITR, CRITB) so as to supply a tint detection signal. A second aspect of the invention provides a camera including such a tint detection circuit. A third aspect of the invention provides a tint selection method including the steps: generating first and second limit signals in dependence on first, second and third color signals; generating first and second color difference signals in dependence on said first, second and third color signals; and determining whether said first and second color difference signals are within windows determined by said first and second limit signals so as to supply a tint detection signal. Advantageous embodiments of the invention defined in the sub-claims have for their object to render the selection of tints automatic while making use of the greater part of existing automatic devices in the camera (automatic white balance control).

These and other aspects of the invention will be apparent from and elucidated with reference to the embodiments described hereinafter.

BRIEF DESCRIPTION OF THE DRAWINGS

In the drawings:

FIG. 2 is a block diagram of a tint detection circuit according to the invention.

Figure 1:
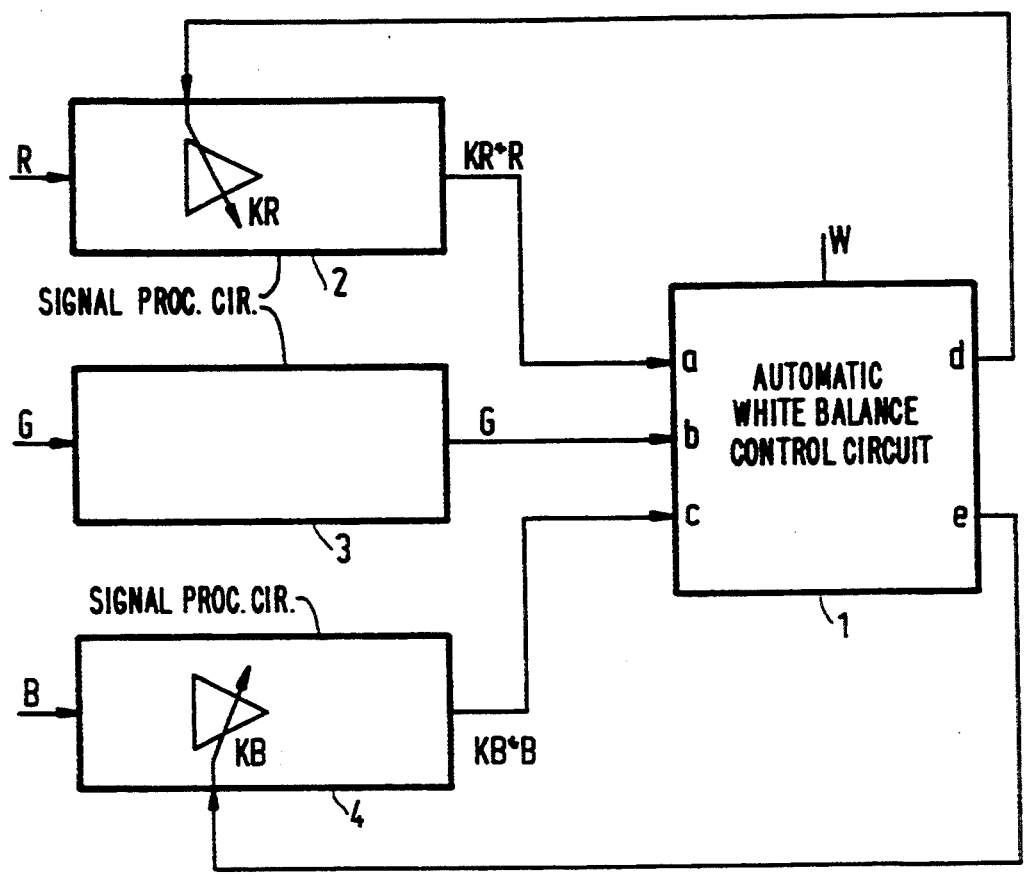
FIG. 1 is a block diagram of a known white balance control circuit.

Any known broadcast camera has a provision for performing a white balance by measuring in the video signal and controlling the gain in the red and blue color signals. This means that a given part of the scene is rendered colorless by manipulation of gains. The surface area in which the measurement is performed, and which is thus colorless controlled, may be indicated by a window within the image plane. The cameraman directs this window onto the plane which is to be colorless controlled, whereafter he activates the automatic control device which measures the color signals within this window and corrects the gain in the red and blue color signals in such a way that the red, green and blue color signals acquire equal amplitudes.

FIG. 1 shows a block diagram of an existing white balance control circuit. The automatic white balance control circuit 1 attempts to render its red input signal a equal to the green input signal b by controlling the gain factor KR in the red video signal processing circuit 2. In the same manner the blue input signal c is rendered equal to the green signal h. The outputs d and e are a measure of the adjusted gain factors KR and KB, respectively. The outputs d and e may be both digital words and voltages.

To be able to adjust fleshtone contours separately, a circuit selecting these fleshtones is required. A possible embodiment is shown in FIG. 2. Color difference signals (G−R) and (G−B) are made by means of subtracter circuits 11 and 12. These signals are compared with criteria CRITR and CRITB in window comparators 13 and 14. The respective comparators operate as follows:

if $CRITB - \text{delta}B < (G-B) < CRITB + \text{delta}B$ then
  $SKINB = 1$, else $SKINB = 0$   [1]

if $CRITR - \text{delta}R < (G-R) < CRITR + \text{delta}R$ then
  $SKINR = 1$, else $SKINR = 0$   [2]

Here, deltaB and deltaR are values to be adjusted, which values determine the selectivity of the comparators. The outputs of the comparators 13 and 14 are connected to a logic AND circuit 19 so that the output of the circuit becomes high when both SKINR and SKINB are high (1), hence when both conditions are satisfied. This output signal can be used to control the contour signal towards a lower amplitude.

The invention preferably uses the automatic white balance control circuit 1—which is present anyway— for selecting the tint at which the contour signal is to be reduced. In this case the measuring window is directed onto the desired tint. The control loop then does not control via the gain factors in red and blue (as with the white balance) but manipulates the selection criteria CR and CB for skintones. To be able to control for chromaticity (selection of output signal is independent of luminance), it will be necessary to work with relative signals. For example, (G−R)/R and (G−B)/B are compared with their respective criteria. Since multipliers can more easily be realised, the criteria CR and CB supplied by the automatic white balance control circuit 1 are multiplied by the green signal G to CRITR and CRITB by means of the multipliers 15 and 16. To be able to control for constant chromaticity differences, the values deltaR and deltaB will have to be proportional to green. However, it is not essentially important for the invention whether there is chroma or chromaticity control. In the ease of chroma control, the multipliers 15 and 16 are dispensed with and CR=CRITR and CB=CRITB. Better results for small green color signal values are obtained if a luminance signal rather than the green color signal G is applied to the multipliers 15 and 16.

By suitable choice of the circuit, the automatic white balance control circuit 1 can continue to control at its original criterion (equality of the red, green and blue color signals). If, during automatic control of the camera, the video signal processing operation (blocks 2, 3 and 4 in FIG. 1) is temporarily modified by switching on switch S1 in such a way that the signal CRITR is added to red R by adder 17 and CRITB is added to blue B by adder 18, then the signal (R+CRITR) is obtained at the output of the adder 17 and the signal (B+CRITB) is obtained at the output of the adder 18. The automatic white balance control circuit 1 attempts to control these signals by manipulating CR and CB to be equal to G so that ultimately: CRITR=G−R and CRITB=G−B.

When the equations [1] and [2] are filled in, it appears that both criteria are satisfied, in other words: at a given combination of red, green and blue color signals at the input, the automatic white balance control circuit 1 sets the criterion in such a way that the given input combination R, G and B satisfies this criterion. In other words, the criterion is automatically set for the color within the measuring window, which was also intended. The calculated criteria CRITR and CRITB are subsequently memorized by the comparators 13 and 14 so that the comparators 13 and 14 subsequently indicate via the logic AND circuit 19 that the selected tint has been detected whenever the color difference signals (G−R) and (B−R) satisfy these criteria. After the criteria CRITR and CRITB have been calculated, the switch S1 is reopened and the automatic white balance control circuit 1 is available again for fulfilling its original function in accordance with FIG. 1.

The embodiment at the component level in the camera comprises circuits on a plurality of printed circuit boards (for the greater pan already present for the automatic white balance control of FIG. 1) and a piece of software in the microcomputer which takes care of the control; on the basis of the information given above, this software can easily be written down. This does not add any information about the essential aspects of the invention so that these details have been omitted here.

The invention may be used in all video cameras having an automatic white balance control, in which there is also a need of choosing different video settings in a given color range to be selected. This is the case in all broadcast television cameras.

I claim:

1. A tint detection circuit for automatically selecting a desired tint in a video signal, comprising:
    limit-signal generating means coupled to receive first (R), second (G) and third (B) color signals in order to generate first and second limit signals (CRITR, CRITB);
    color-difference generating means coupled to receive said first (R), second (G) and third (B) color signals in order to generate first and second color difference signals (G−R, G−B); and
    window comparison means coupled to said limit-signal generating means and to said color-difference generating means (11, 12) in order to determine whether said first and second color difference signals (G−R, G−B) are within windows determined by said first and second limit-signals (CRITR, CRITB) so as to supply a tint detection signal.

2. A tint detection circuit as claimed in claim 1, wherein said limit-signal generating means comprise:
    adders for temporarily adding said limit signals (CRITR, CRITB) to said first (R) and third (B) color signals; and
    automatic white balance control means coupled to said adders for generating said first and second limit signals (CRITR, CRITB).

3. A tint detection circuit as claimed in claim 2, wherein said automatic white balance control means comprise:
    an automatic white balance control unit coupled to said adders for generating first and second criterion signals (CR, CB); and
    multipliers coupled to receive said second color signal (G) and said first and second criterion signals (CR, CB) for generating said first and second limit signals (CRITR, CRITB).

4. A camera provided with a tint detection circuit as claimed in claim 1.

5. A method of automatically selecting a desired tint in a video signal, comprising the steps of
    generating first and second limit signals in dependence on first, second and third color signals;
    generating first and second color difference signals in dependence on said first and second color difference signals; and
    determining whether said first and second color difference signals are within windows determined by said first and second limit-signals so as to supply a tint detection signal.

* * * * *